United States Patent
Rothermel

[19]

[11] Patent Number: 5,959,812
[45] Date of Patent: Sep. 28, 1999

[54] FRINGE FIELD COMPENSATION SYSTEM FOR MULTI-TRACK SERVO RECORDING HEAD

[75] Inventor: Stephen J. Rothermel, Roseville, Minn.

[73] Assignee: Imation Corp., Oakdale, Minn.

[21] Appl. No.: 08/900,523

[22] Filed: Jul. 25, 1997

[51] Int. Cl.$^6$ .............................. G11B 5/27; G11B 5/02; G11B 5/584
[52] U.S. Cl. ........................ 360/118; 360/57; 360/77.12
[58] Field of Search ................................ 360/57, 84, 118, 360/119, 121

[56] References Cited

U.S. PATENT DOCUMENTS

| | | | |
|---|---|---|---|
| Re. 33,949 | 6/1992 | Mallary et al. | 360/110 |
| 2,610,257 | 9/1952 | Wissmann | 360/57 |
| 2,635,149 | 4/1953 | Cain | 360/118 |
| 3,102,170 | 8/1963 | Koning | 360/118 |
| 3,382,325 | 5/1968 | Camras | 360/66 |
| 3,439,126 | 4/1969 | Atsumi | 360/105 |
| 3,725,607 | 4/1973 | Angold | 360/118 |
| 3,848,217 | 11/1974 | Lazzari | 360/113 |
| 3,881,190 | 4/1975 | Brock et al. | 360/113 |
| 3,882,544 | 5/1975 | Hughes | 360/118 |
| 3,947,891 | 3/1976 | Saito et al. | 360/118 |
| 4,434,445 | 2/1984 | Van Herk | 360/121 |
| 4,455,582 | 6/1984 | Yanagida et al. | 360/77.12 |
| 4,613,919 | 9/1986 | Miyatake et al. | 360/118 |
| 4,670,799 | 6/1987 | Ogura et al. | 360/66 |
| 4,691,260 | 9/1987 | Hoseka et al. | 360/121 |
| 4,786,991 | 11/1988 | Yamamori | 360/66 |
| 4,799,115 | 1/1989 | Rogers et al. | 360/66 |
| 5,198,948 | 3/1993 | Stover et al. | 360/124 |
| 5,229,895 | 7/1993 | Schwarz et al. | 360/77.12 |
| 5,617,269 | 4/1997 | Gordenker et al. | 360/46 |

FOREIGN PATENT DOCUMENTS

| | | |
|---|---|---|
| 60-121504 | 6/1985 | Japan . |
| 63-271705 | 11/1988 | Japan . |
| 1-037709 | 2/1989 | Japan . |
| 1-223610 | 9/1989 | Japan . |
| 1-279406 | 11/1989 | Japan . |

OTHER PUBLICATIONS

"Recording Heads," *Magnetic Recording Handbook,,* Mee and Daniel, Eds., (19), Part 1, Chapter 4, pp. 262–271, McGraw–Hill Publishing Company.

"Magnetic Fields of Finite Track Width Heads," Lindholm, *IEEE Transactions on Magnetics,* vol. MAG–13, No. 5, Sep. 1977, pp. 1460–1462.

"Side–Fringing Response to Magnetic Reproducing Heads," Van Herk, *Journal of the Audio Engineering Society,* vol. 26, No. 4, Apr. 1978, pp. 209–211.

"Calculation of the Magnetic Field in the Ferromagnetic Layer of a Magnetic Drum," Karlqvist, *Trans. Roy. Inst. Technol.,* (Stockholm), No. 86, 1954.

*Primary Examiner*—Aristotelis M. Psitos
*Assistant Examiner*—Regina Y. Neal
*Attorney, Agent, or Firm*—Eric D. Levinson

[57] ABSTRACT

A multi-track servo recording head assembly records a plurality of identical tracks of servo information longitudinally defined within a very high density servo section along a magnetic recording medium. The servo recording head assembly includes a write transducer for writing a servo signal, as well as an erase transducer that includes two outer erase elements and at least one inner erase element positioned between the two outer erase elements. Each erase element erases alternating portions of the servo signal to create at least one of the plurality of tracks of servo information in the servo section. The outer erase element and the inner erase element are positioned transversely across the servo section, with the inner erase elements having an erase head width that is less than an erase head width of the outer erase elements. The difference in erase head widths between the inner erase elements and the outer erase elements compensates for a combined fringe field effect that occurs between adjacent erase elements when creating a very high density multi-track servo section on a longitudinal magnetic recording tape. As a result, even though the erase head widths of the inner and outer erase elements are different, the resulting track width of each of the plurality of tracks of servo information is substantially identical.

17 Claims, 7 Drawing Sheets

FRINGE FIELD COMPENSATION SYSTEM FOR MULTI-TRACK SERVO RECORDING HEAD

BACKGROUND OF THE INVENTION

1. Field of the Invention

The present invention relates generally to magnetic recording heads, and, more particularly, to a compensation system for the fringe field effects induced in very high density, multi-track servo recording heads.

2. Description of the Related Art

A multi-track servo recording head assembly is described in U.S. Pat. No. 5,229,895 for recording a unique servo control track on a magnetic recording tape that can be used to control the track-to-track positioning of a magnetic read/write head during recording and playback of computer data. In this patent, the servo track is created by alternately erasing and not erasing portions of a servo track onto which a servo signal previously had been recorded so as to form a longitudinal series of erase portions along the servo section of the magnetic recording tape. The erase portions of each servo track are used by a head position control system to position a plurality of sets of read/write transducers in the recording head assembly in line with selected data tracks on a data portion of the magnetic recording tape.

Although the multi-track servo track generated by a recording head of the type described in U.S. Pat. No. 5,229,895 allows for an increased number of data tracks to be defined along a magnetic recording tape, it is to be expected that servo control errors will tend to increase as the track density of the magnetic recording tape is increased. For very high density recording at track pitches that are less than 60 $\mu$m, and particularly less than 40 $\mu$m, variations in servo track position may exceed the tolerance margins of the head position control system, in which case, servo control errors are generated. Accordingly, it would be desirable to provide a system to reduce or prevent the types of servo control errors that may occur in magnetic recording tapes having very high density servo tracks recorded by multi-track servo recording heads.

Although the existence of fringe fields produced by magnetic recording heads is partially known and understood in terms of single head recording assemblies, there has been no indication that fringe fields might cause problems when using a multiple erase head recording assembly to create multi-track recordings that require very uniform track widths. At dimensions less than 60 $\mu$m, and particularly less than 40 $\mu$m, however, the fringe fields of adjacent erase elements interact so as to create a combined fringe field that is larger than the fringe field of a single erase element when both erase elements are recording the same signal. As a result, the servo track pitch of the region erased by inner erase elements tends to be somewhat larger than the servo track pitch of the region erased by outer erase elements in the servo section. This variation in servo track pitch can cause variations in servo position that ultimately lead to servo control errors when the variations extend beyond the tolerance range of the head positioning control system.

SUMMARY OF THE INVENTION

The present invention is a multi-track servo recording head assembly for recording a plurality of tracks of servo information within a very high density servo section longitudinally defined along a magnetic recording medium, as well as a method for head calibration. The servo recording head assembly includes a write transducer for writing a servo signal, as well as an erase transducer that includes two outer erase elements and at least one inner erase element positioned between the two outer erase elements. Each erase element erases alternating portions of the servo signal to create parts of at least one of the plurality of tracks of servo information in the servo section. The outer erase element and the inner erase element are positioned transversely across the servo section, with the inner erase elements having an erase element width that is less than an erase element width of the outer erase elements. The difference in erase element widths between the inner erase elements and the outer erase elements compensates for a combined fringe field effect that occurs between adjacent erase elements when creating a very high density multi-track servo section on a magnetic recording tape. As a result, even though the element widths of the inner and outer erase elements are different, the resulting track width of each of the plurality of tracks of servo information is substantially identical.

The present invention recognizes that servo control errors of the type previously described can occur in the recording of very high density multi-track servo sections due to the interaction of the fringe fields of adjacent erase elements when those erase elements are positioned very close to one another. This type of error can occur in a number of situations. For example, in very high density recording at track widths of less than 60 $\mu$m, and particularly less than 40 $\mu$m; when adjacent erase elements are simultaneously generating similar or identical erase signals, as is the case when erasing alternating portions of a servo signal to record a servo track; and when the gap length is a significant portion of the servo track pitch, particularly when the gap length is greater than 15% of the servo track pitch, in order to obtain better erasure of the signal.

In accordance with a first aspect of the present invention, a multi-track servo recording head assembly records a plurality of tracks of servo information longitudinally defined within a servo section along a magnetic recording medium. The plurality of tracks of servo information are used for controlling a position of a magnetic head assembly relative to a plurality of tracks of data information within a data section along the recording medium. The servo recording head assembly includes a write transducer for writing a servo signal that extends substantially uniformly over a width of the servo section of the magnetic recording medium, as well as an erase transducer that includes two outer erase elements and at least one inner erase element positioned between the two outer erase elements. Each outer erase element erases alternating portions of the servo signal in the servo section to create at least one of the plurality of tracks of servo information. Each inner erase element erases alternating portions of the servo signal in the servo section, creating at least part of the servo track on at least one side of the element. The outer erase element and the inner erase element are positioned transversely across the width of the servo section, with the inner erase elements having an erase head width that is less than an erase head width of the outer erase elements. The erase head widths of the inner erase elements and the outer erase elements are chosen such that a track width of each of the plurality of tracks of servo information is substantially identical.

Alternatively, or in addition, the current applied to the erase transducer or erase elements of the head can be controlled to adjust the strengths of their fringe fields relative to other erase transducers. Adjusting the current in this fashion has the advantage of allowing calibration of the head after manufacture, potentially reducing the stringency of the erase channel width tolerance requirements for the head. This head current calibration compensates for transducer to transducer variations in the nominal erase element width, provided that the element to element variations within each head transducer are small. This current calibration can be applied to any erase transducer with at least one erase element.

In accordance with another aspect of the present invention, a multi-track servo recording head assembly records a plurality of tracks of servo information longitudinally defined within a servo section along a magnetic recording medium. The plurality of tracks of servo information are usable for controlling a position of a magnetic head assembly relative to a plurality of tracks of data information longitudinally defined within a data section along the recording medium. The servo recording head assembly includes a write transducer for writing a servo signal that extends substantially uniformly over a width of the servo section of the magnetic recording medium, as well as an erase transducer for erasing portions of the servo signal that have at least one inner erase element positioned transversely between the two outer erase elements. Each inner erase element erases alternating portions of the servo signal in the servo section to create part of at least one of a plurality of tracks of servo information. The outer edges of the outer erase elements are not used to erase alternating portions of the servo signal. The inner edges of the outer erase elements can either erase alternating portions of the servo signal in the servo section to create one of a plurality of tracks of servo information, or they can erase nothing. The outer erase element width is not required to be wider than the inner erase element width since only the inner edge of the outer erase element is used for a creating a servo track or generating a fringe field for an adjacent inner erase element.

In accordance with a further aspect of the present invention, a multi-track servo recording head assembly records a plurality of tracks of servo information longitudinally defined within a servo section along a magnetic recording medium. The plurality of tracks of servo information are usable for controlling a position of a magnetic head assembly relative to a plurality of tracks of data information longitudinally defined within a data section along the recording medium. The servo recording head assembly includes a write transducer for writing a servo signal that extends substantially uniformly over a width of the servo section of the magnetic recording medium, and an erase transducer having two outer and at least one inner erase elements for erasing portions of the servo. Optionally, conductive material can be positioned near the outside edge of each outer erase element. Each inner and outer erase element erases alternating portions of the servo signal in the servo section to create at least one of a plurality of tracks of servo information. The outer elements are positioned transversely across the width of the servo. In addition, if the conductive element is provided on the outside of each outer erase element, it can further alter the fringe field produced by the outer erase element on the outer side such that the track width of each of the plurality of tracks of servo information is substantially identical.

As will be apparent, using any of these techniques, the present invention compensates for the combined fringe field effect that may occur between adjacent erase elements when creating a very high density multi-track servo section on a magnetic recording tape. In addition, the present invention compensates for head to head variability in erase channel width.

DESCRIPTION OF THE PREFERRED EMBODIMENTS

Figure 1:
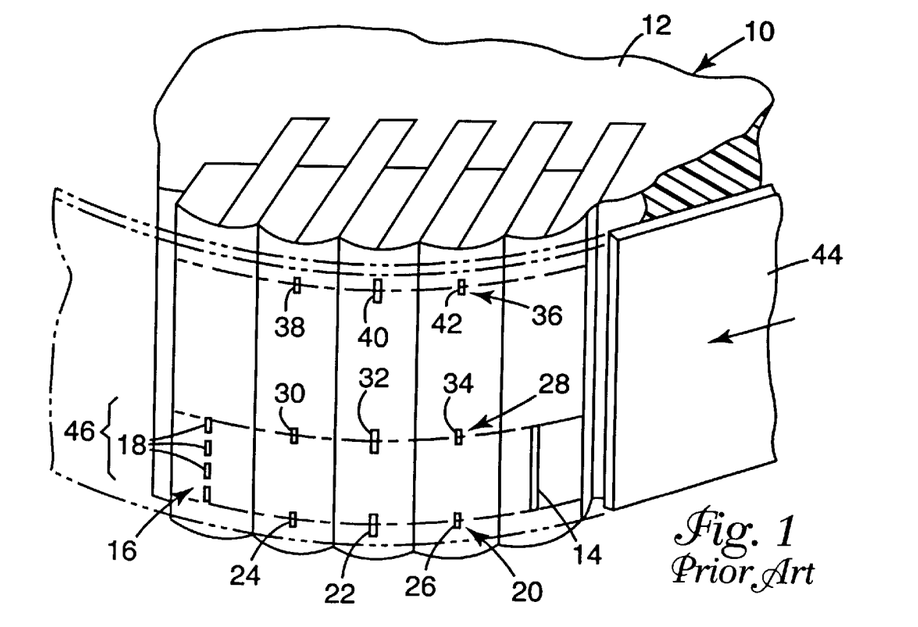
FIG. 1 is an isometric view of a prior art multi-track servo recording head assembly.

FIG. 1 is a partially cut-away isometric view of a head assembly 10 of a prior art multi-track servo recording head assembly. Head assembly 10 includes a support base 12 within which are mounted a plurality of transducers. Of particular interest to the present invention are a servo write transducer 14 and a servo erase transducer 16. Servo write transducer 14 has an extended transverse gap width (W1) equal to the width of the desired servo section of a magnetic recording tape. Such a section may have a plurality of servo tracks, each having a width (W2). In contrast, servo erase transducer 16, while having a total width equal to that of servo write transducer 14 (i.e., W1), is divided into erase elements 18, with each erase element 18 being equal to the width of one of the desired servo tracks (W2), each of the erase elements 18 being separated from an adjacent erase element by a similar width (W2). It will be noted that the width (W2) of each desired servo track in this prior art head assembly 10 is typically more than 65–100 $\mu$m.

Head assembly 10 further includes a plurality of read and/or write transducers. These transducers are connected to support base 12, and, in the embodiment shown in FIG. 1, include three sets 20, 28, and 36 of read-write-read transducers, each set being spaced apart from an adjacent set by a distance equal to an integral multiple of the transverse width (W1) of the servo section established by the width of servo write transducer 14. Thus, first set 20 includes a centermost located write transducer 22 and, located on either side thereof, read transducers 24 and 26. First set 20 is positioned in line with the lower edge of first servo write transducer 14, such that read transducers 24 and 26 will automatically be positioned to read the servo track at the lower edge of the servo section. Similarly, second set 28 of read/write transducers 30, 32 and 34, respectively, is positioned in transverse alignment with first set 20, but spaced away from first set 20 a distance equal to the width of the servo section. Accordingly, transducers 30, 32 and 34 will be positioned to read and/or write corresponding data tracks within an adjacent section of data tracks. Finally, third set 36 of read/write transducers 38, 40 and 42, respectively, is located in transverse alignment with first set 20 and second set 28, but is spaced transversely from second set 28 a distance equal to two times the width of the servo section.

The manner in which such variously-spaced transducers are utilized to read data tracks within respective sections on a longitudinal magnetic tape is disclosed in U.S. Pat. Nos. 5,008,765 and 5,229,895. In any event, a magnetic tape 44, passing along a transport path adjacent head assembly 10 may, in a first instance pass in the direction of the arrow from right to left, such that a servo track extending the width of the entire servo section is first recorded by servo write transducer 14, and is subsequently partially erased by servo erase transducer 16. The resultant servo tracks may then be played back by the respective read transducers in one of the sets 20, 28 or 36 of transducers, while data is being recorded and/or played back by the read/write transducers of the other sets of transducers. The use of two read transducers in each set 20, 28 and 36 enables data retrieval in either direction of tape travel. The magnetic gaps of all of the respective transducers, whether they are provided for recording, playing back, or erase, are in each case orthogonal to the direction of travel of magnetic tape 44 and in substantially the same sheet as the media of magnetic tape 44.

Figure 2:
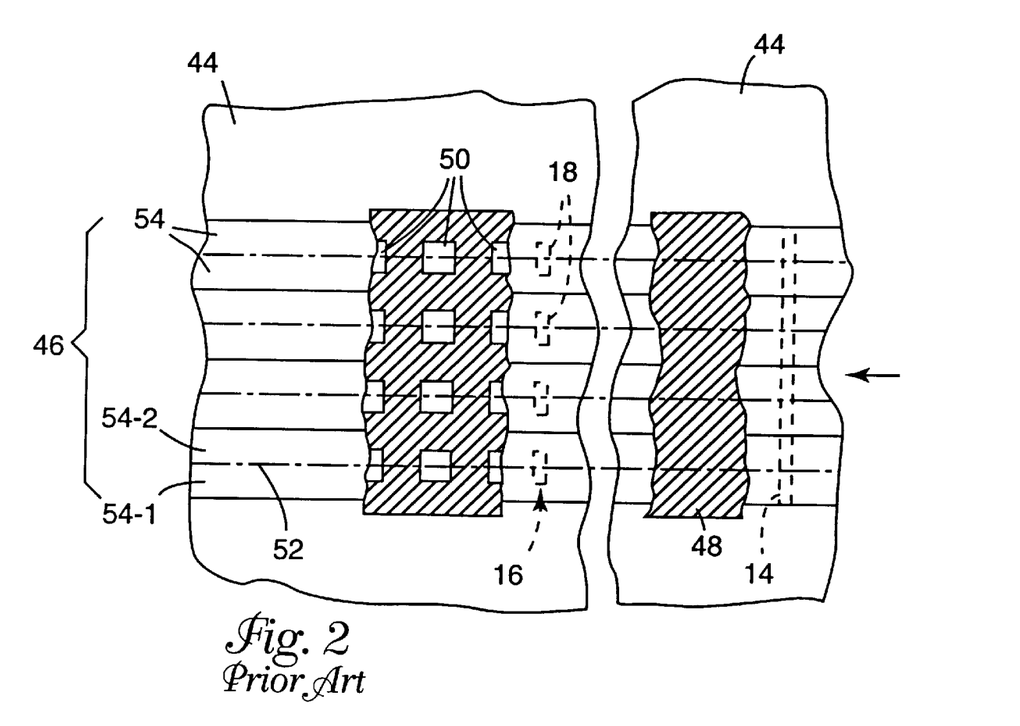
FIG. 2 is a conceptual view of the servo write and erase transducers of the head assembly of FIG. 1 and the resultant recorded servo tracks.

A description of the manner in which the servo tracks are recorded for a prior art multi-track servo recording head assembly is set forth in more detail in the conceptual view of FIG. 2. The resultant recorded patterns of a servo section 46 of magnetic tape 44 are shown adjacent the associated write and erase transducers 14 and 16, respectively. The action of servo write transducer 14 produces a continuously-recorded pattern 48 which extends uniformly from one edge to the other edge of servo section 46. Next, servo erase transducer 16, being made up in this view of four erase elements 18, periodically erases portions 50 of the previously continuously-recorded pattern 48.

As previously noted, each of the erase elements 18 are one track wide and are offset from the desired tracks by one-half track width. Thus, for example, there is established a center line 52 along which a transition between continuously recorded pattern 48 and erased portions 50 exists. In the example shown in FIG. 2, a total of four erase elements 18 of erase transducer 16 are used to create eight servo tracks 54. Center line 52 defines an edge between adjacent servo tracks 54-1 and 54-2, for example, such that adjacent servo tracks 54 have erased portions 50 that are mirror images of each other with respect to center line 52. The resulting repeating series of full width recorded pattern 48 followed by half-width erased portion 50 that is created for each servo track 54 is preferably used by the sets of read/write transducers 20, 28, and 36 to determine the transverse offset of the read/write transducers with respect to the servo tracks 54. The fact that adjacent servo tracks 54 are mirror images of one another results in the read/write transducers detecting signals that are of opposite polarities for adjacent servo tracks 54.

Figure 3:
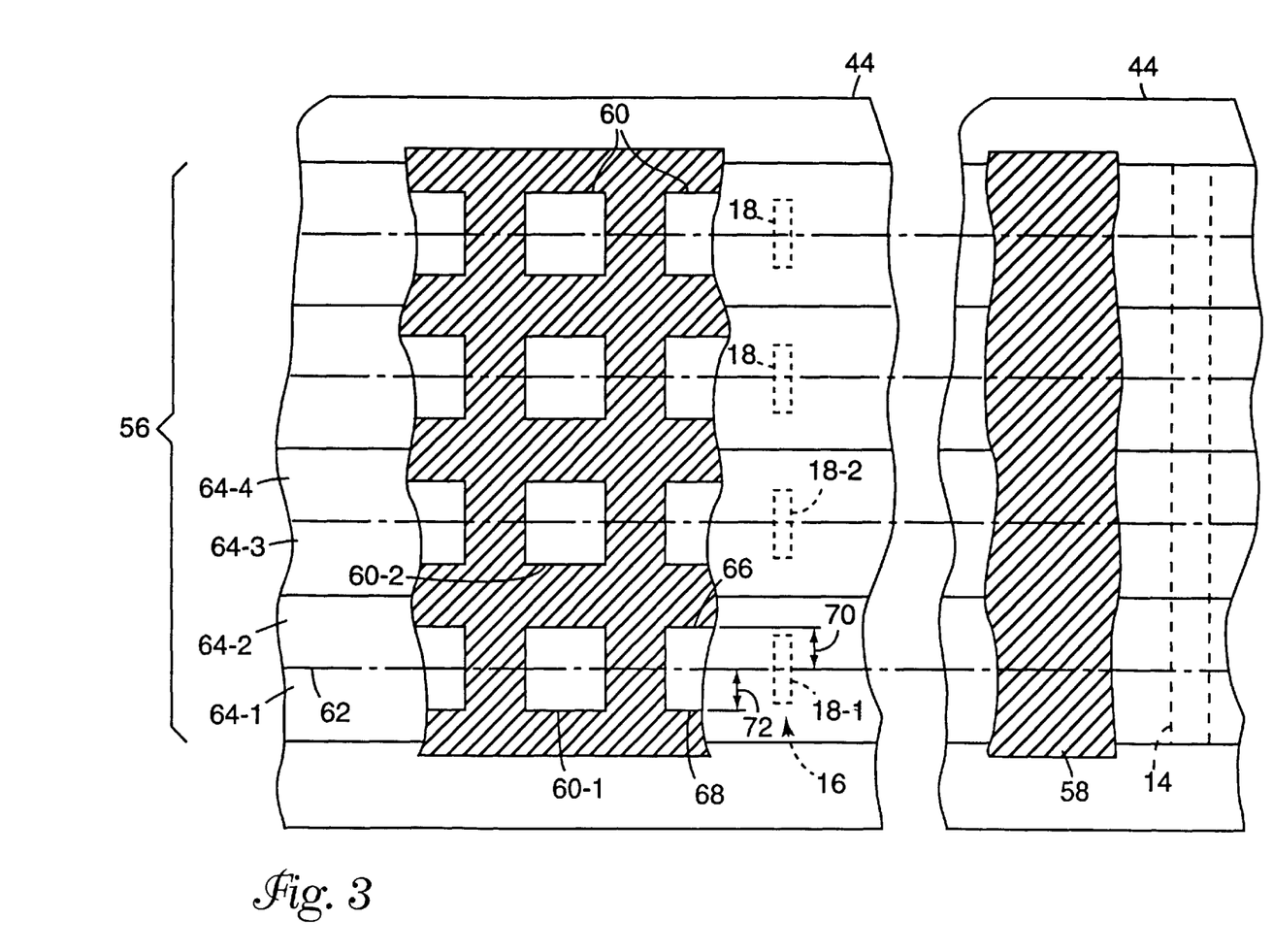
FIG. 3 is an enlarged conceptual view similar to FIG. 2 showing the resultant recorded servo tracks for a head assembly of FIG. 1 having a very high density track pitch.

Referring now to FIG. 3, an example of what would happen if very high density servo tracks were recorded using a prior art multi-track servo recording head assembly 10 is shown. Like prior art servo section 46, a very high density servo section 56 recorded using recording head assembly 10 would include a continuously recorded pattern 58 and periodically erased portions 60. As in the example shown in FIG. 2, the example shown in FIG. 3 uses a total of four erase elements 18 of erase transducer 16 to create eight servo tracks 64. Center line 62 will define an edge between adjacent servo tracks 64-1 and 64-2, for example, such that adjacent servo tracks 64 would have erased portions 60 which should be mirror images of each other with respect to center line 62. Unfortunately, not all of the adjacent erased portions 60 in FIG. 3 are identical mirror images of one another. Unlike servo section 46 where the width of each erase portion 50 corresponds identically with the width of erase element 18, in FIG. 3 it can be seen that the width of each erase portion 60 is slightly wider than the width of each section 18. While this difference between the width of erase element 18 and the width of erase portion 60 might not be problematic if all of the resulting erase portions 60 were the same width, it can also be seen that there is a significant variation, for example, between the width of erase portion 60-1 corresponding to servo tracks 64-1 and 64-2 and the width of erase portion 60-2 corresponding to servo tracks 64-3 and 64-4. These variations will directly affect the ability of sets of read/write transducers 20, 28, or 36 to accurately position themselves on servo tracks 64-1 and 64-2 because the resulting servo signals which are read by the read/write transducers would vary between the two tracks, even though sets of read/write transducers 20, 28, or 36 were accurately positioned over servo tracks 64-1 and 64-2, for example.

It is believed that these variations in the widths of the erase portions 60 are due to an adjacent fringe field effect that occurs between adjacent erase elements 18 when the intended track width (W2) is decreased to below 60 $\mu$m, and particularly below about 40 $\mu$m. At these dimensions, there is a significant interaction of the fringe field effects produced by the magnetic head gaps of adjacent erase elements 18 of servo erase transducer 16. In other words, on an inner side 66 of portion 60-1 that is between two adjacent erase elements 18, the magnetic fringe field created by adjacent erase elements 18-1 and 18-2 will combine to result in inner side 66 being extended, thereby widening a width 70 of that side of portion 60-1. In contrast, where there is an outer side 68 in which there are no adjacent erase elements 18 beyond that side of portion 60-1 then there is no combined fringe field effect and a width 72 of portion 60-1 is not increased on that side.

The existence of fringe fields in magnetic recording heads is known and fringe fields have been used in single head recording assemblies, such as described in U.S. Pat. Nos. 2,635,149, 4,670,799 and 4,434,445. The effects of side-fringing in magnetic recording heads has also been explored in the literature. *Magnetic Recording Handbook*, Mee, C. and Daniel, E. eds., McGraw-Hill Publ. Co., (1989), Chpt. 4.2, pp. 262–271, Lindholm, D. "Magnetic Fields of Finite Track Width Heads", *IEEE Transactions on Magnetics*, Vol. Mag-13, No. 5, September 1977, pp. 1460–1462; Van Herk, A., "Side-Fringing Response of Magnetic Reproducing Heads", *Journal of The Audio Engineering Society*, Vol. 26, No. 4, April 1978, pp. 209–211; and Karlqvist, O., "Calculation of the Magnetic Field in the Ferromagnetic Layer of a Magnetic Drum", *Trans. Roy. Inst. Technol.* (Stockholm) no. 86, 1954. In each of these references, the fringe fields are generated or analyzed with reference to a single magnetic recording head. Since only a single magnetic recording head is involved, there is no suggestion as to what effect, if any, fringe fields might play in a device having multiple recording heads.

The existence of fringe fields has been discussed in multiple head recording assemblies, such as described in U.S. Pat. Nos. 3,102,170; 3,725,607; 3,882,544 and 4,691, 260. None of these references, however, have identified or suggested that there may be a potential problem of a combined fringe field effect between adjacent erase heads at very high track densities that would alter the track width of a portion of the magnetic tape being erased. Due to the unique recording characteristics inherent in creating a servo track, these references actually are not relevant to a servo recording head assembly. The multi-track magnetic head assemblies in each of these references are used to record data tracks, not servo tracks. In a data track, there is a need to prevent adjacent heads from recording similar information, as described for example in U.S. Pat. No. 3,102,170. In contrast, when creating a servo track, an entire series of transducers will simultaneously record substantially the same erase signal. It is believed that it is the erasing of identical or highly similar servo signal patterns, combined with the very high track densities, which creates the combined fringe field effect problem that is identified by the present invention.

Figure 4:
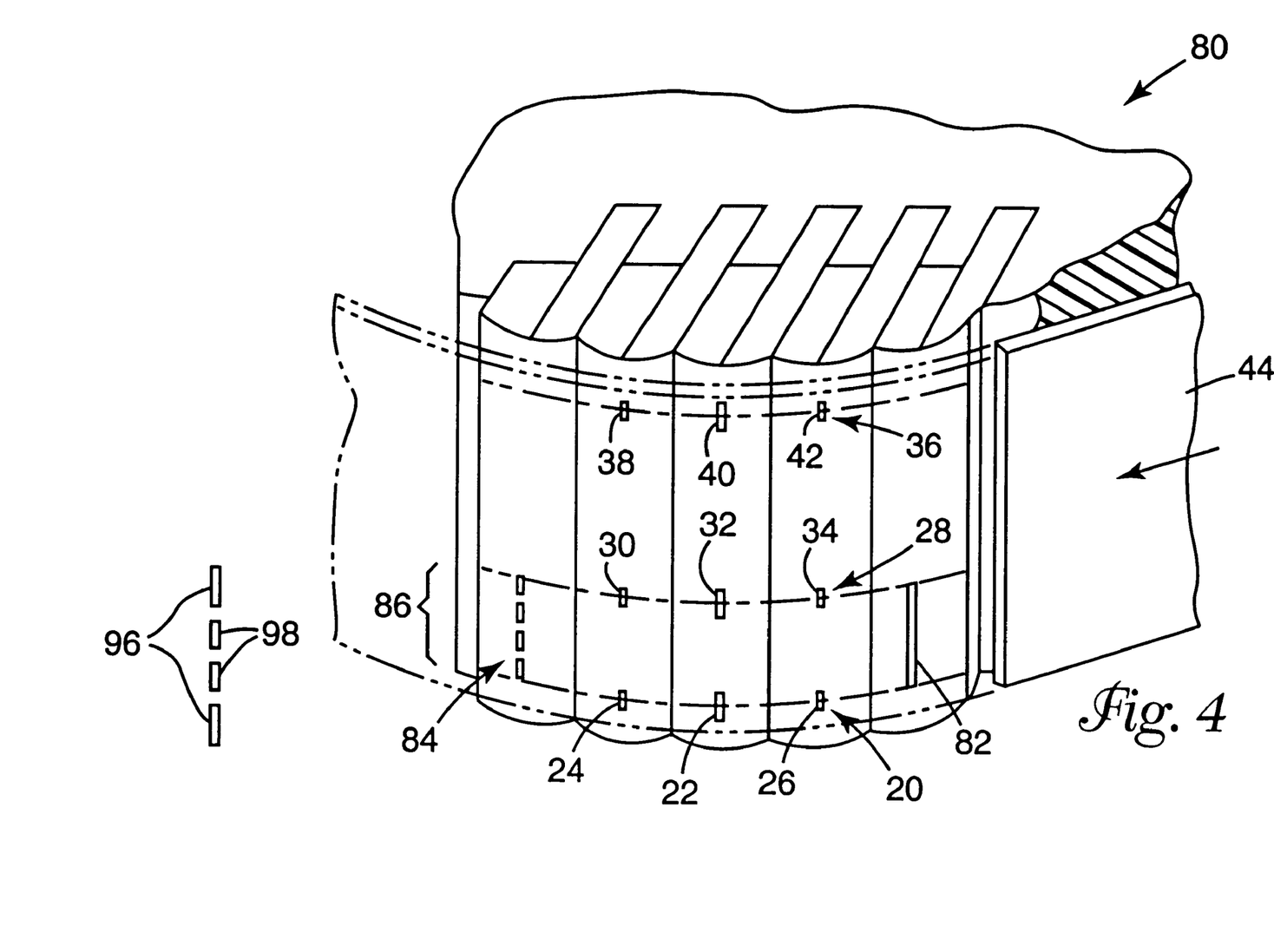
FIG. 4 is an isometric view of a multi-track servo recording head assembly in accordance with the present invention having a very high density track pitch.

Referring now to FIG. 4, a very high density multi-track servo recording head assembly 80 in accordance with a preferred embodiment of the present invention is shown. The structure and operation of the read/write transducers is similar to that of head assembly 10 as described above and like reference numerals refer to like features. Like head assembly 10, head assembly 80 includes a write transducer 82 and an erase transducer 84 which together create a servo section 86. Unlike erase transducer 16 of head assembly 10 which is comprised of identical erase elements 18, erase transducer 84 of head assembly 80 is comprised of two different types of erase elements, outer erase elements 96 and inner erase elements 98.

Figure 5:
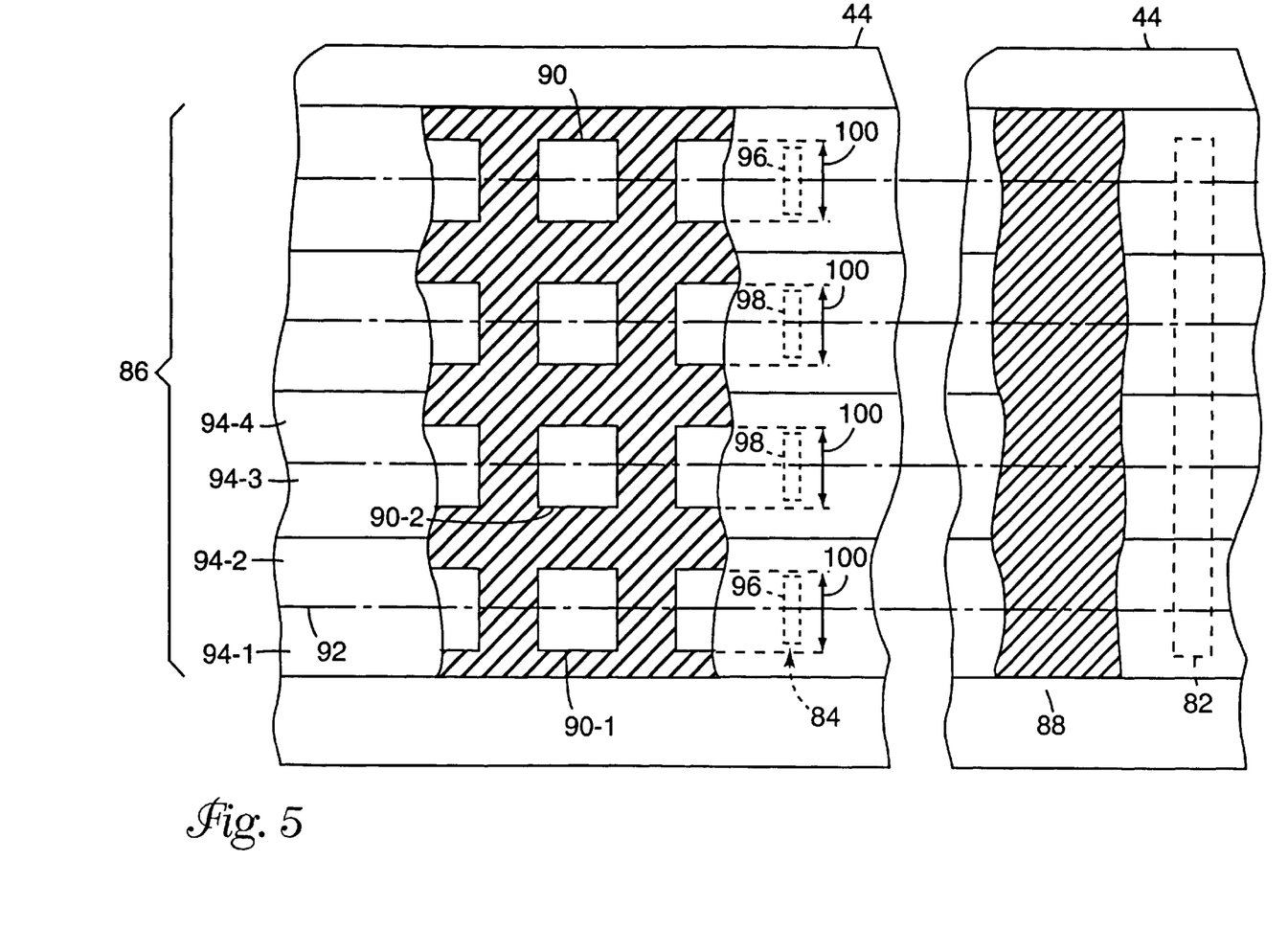
FIG. 5 is an enlarged conceptual view similar to FIG. 3 showing the resultant recorded servo tracks for a head assembly of FIG. 4 at the very high density track pitch.

Referring to FIG. 5, it can be seen that like prior art servo section 46, servo section 86 in accordance with the present invention includes a continuously recorded pattern 88 and periodically erased portions 90. As in the previous examples, erase transducer 84 is used to create eight servo tracks 94. Center line 92 will define an edge between adjacent servo tracks 94-1 and 94-2, for example, such that adjacent servo tracks 94 would have erased portions 90 that are mirror images of each other with respect to center line 92. In addition to the servo track pattern as shown in FIG. 5 where recorded pattern 88 and erased portion 90 are essentially identical to one another, it is contemplated that the present invention would work equally well with other types of servo track patterns.

As shown in the exploded detail of FIG. 4 and in FIG. 5, erase transducer 84 includes two outer erase elements 96 and at least one inner erase element 98. Both erase elements 96 and 98 are substantially smaller in relation to the intended servo track width (W2) than erase elements 18 in order to compensate for the fringe field effect of each erase element. In addition, inner erase elements 98 are smaller in width than outer erase elements 96 in order to compensate for the combined fringe field effect observed only between adjacent erase elements. It will be understood that erase transducer 84, including erase elements 96 and 98 are preferably gap-style erase transducers, although the present invention is equally applicable to other types of erase transducers, such as pole-tip erase transducers.

As can be seen by comparing the size of erase portions 90 as shown in FIG. 5 with the size of erase portions 60 as shown in FIG. 3, all of the erase portions 90 are of a substantially identical width 100, even though erase portions 90-1 and 90-2 that are erased by erase elements 96 and 98 are of different erase head widths. As a result, there is no degradation in the ability of sets of read/write transducers 20, 28, or 36 to accurately position themselves on servo tracks 94-1 and 94-2 when the dimensions of servo tracks 94-1 and 94-2 are below 60 $\mu$m, and particularly below about 40 $\mu$m. Unlike the servo track section 46 which would be produced by head assembly 10 at these dimensions, there is very little or no variance among the widths of erase portions 90. Consequently, the resulting servo signals which are read by the read/write transducers will not vary between adjacent servo tracks when sets of read/write transducers 20, 28, or 36 are accurately positioned over the servo tracks.

Figures 6, 7:
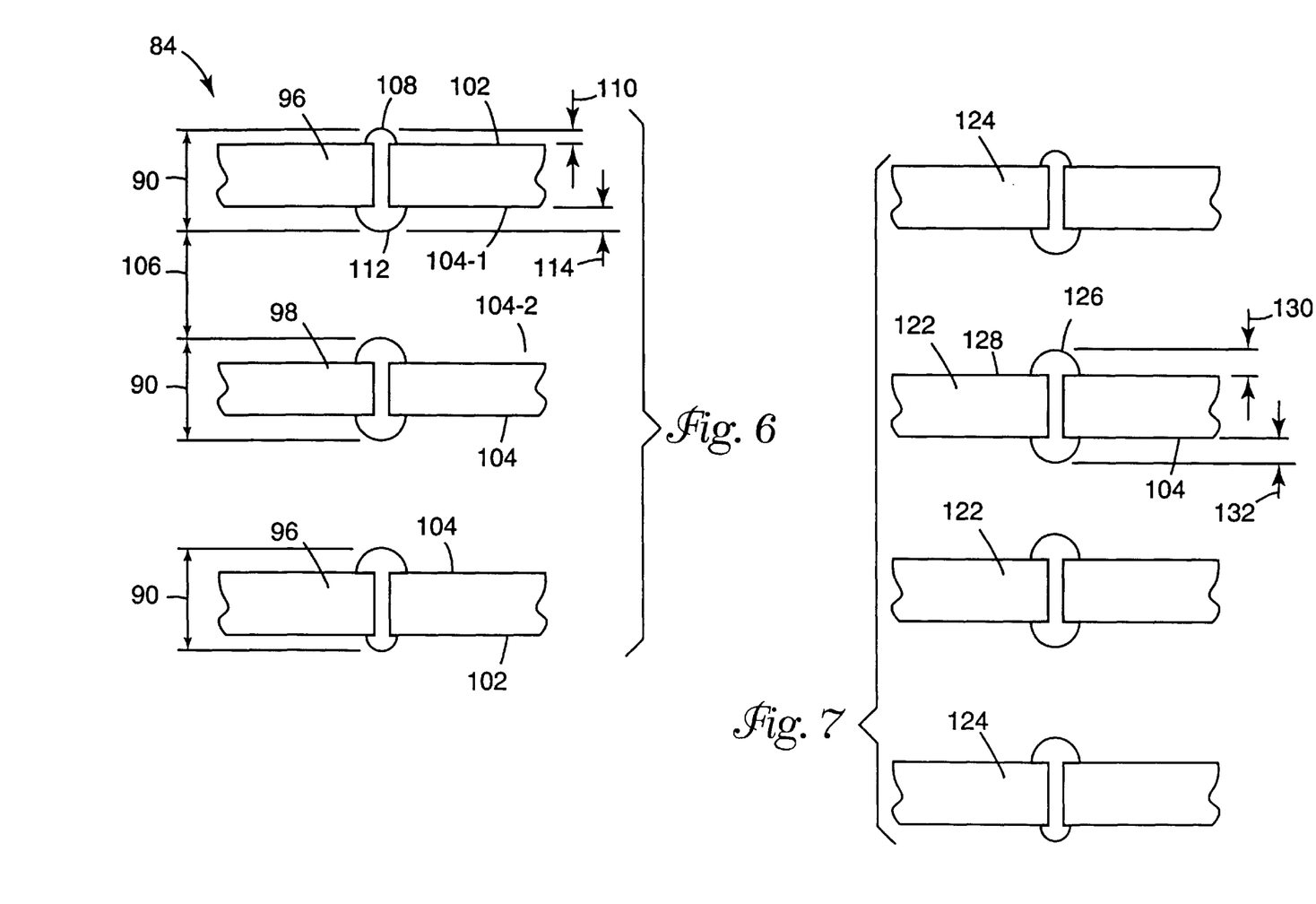
FIG. 6 is a more detailed view of FIG. 5 showing the outer side and inner side erase width for each servo track.
FIG. 7 is a detailed view similar to FIG. 6 of an alternate embodiment of the multi-track servo recording head having two outer erase elements that do not use the outer edges for producing tracks of servo information.

Referring to FIG. 6, the operation of a multiple gap magnetic erase transducer 84 which compensates for side fringe fields of an adjacent erase transducer will be described in further detail. FIG. 6 shows an erase transducer 84, having three erase elements, namely, two outer erase elements 96 and one inner erase element 98. Outer erase elements 96 each have one outer side 102 and one inner side 104. Inner erase element 98 has two inner sides 104. As previously indicated, inner erase element 98 is slightly narrower than outer erase elements 96, but the space 106 between adjacent erase elements is equal. At the sides of each erase element 96, 98, a fringe field is produced that is a function of the current passed through the erase head windings. Outer side 102 will generate a fringe field 108 that determines an outer side erase width 110. Inner sides 104-1 and 104-2 combine to produce a combined fringe field 112 that determines an inner side erase width 114.

The current driving the erase head windings of erase transducer 84 is adjusted until the width of erase portions 90 matches the desired servo track pitch. Although the difference in current is theoretically calculable, it is very difficult to identify all variables in practice, particularly given manufacturing tolerances. It therefore is easier and faster simply to do a final calibration of the head during manufacture. This can typically be accomplished by starting at a known current, altering the current by some predetermined amount, for example, 20%, then interpolating to find the ideal current. Greater accuracy can be achieved by narrowing the span of the adjustment, if needed.

The range of calibration depends on the erase element width. The greater the difference between the erase element width and the servo track pitch, the greater the range of calibration, provided that the erase transducer is not too narrow. An erase element width that is 2.5 $\mu$m less than the servo track pitch provides some adjustment range, about ±0.5 $\mu$m, while an erase element width that is 5 $\mu$m less than the servo track pitch provides a greater adjustment range, about ±1 $\mu$m.

The gap length should be about equal to or less than the difference between the servo track pitch and the erase element width for a semi-infinite pole head, more for a finite pole head, to insure sufficient erasure at the required erase operating current.

In addition, the erase current, whether AC or DC, must be turned on for less than a 50% duty cycle to obtain a 50% duty cycle in the erased alternating portions of the servo signal. The duty cycle must be reduced by the time required for the tape to move more than one erase gap length.

Furthermore, for an AC erase current, the rise time (t) for the current decay of the on/off transitions between erase portions and the non-erase portions of servo signal may be controlled to reduce or eliminate a residual low frequency pulse.

Combined fringe field 112 is produced by erase transducer 84 because the side erase field of adjacent erase elements will add to each other when the erase elements 96, 98 are closer together than 60 μm, and particularly less than about 40 μm. In theory, the side erase fields may add to each other at any spacing between adjacent erase elements, however, the combined fringe field effect has been found to be inconsequential above 60 μm. Below 60 μm, and particularly below 40 μm, the strength of combined fringe field 112 is significant and, as a result, the size of inner erase width 114 is increased. In order to compensate for the difference between outer erase width 110 and inner erase width 114, a first embodiment of the present invention adjusts the width of inner erase element 98 so that erase portions 90 are of an identical width for all of the erase elements 96 and 98.

To write multiple servo bands simultaneously, a head assembly 80 can include two or more write transducers 82 and two or more erase transducers 84. In this embodiment the erase elements all have the same space 106 between them, regardless of the width of the erase head for adjacent erase elements.

As previously indicated, the erase current passing through the windings of the erase heads is adjusted to compensate for the difference in the width of the erase heads for erase elements 96 and 98 until the width of erase portion 90 is identical for all of the erase elements 96 and 98. In addition, for an AC erase current, the rise time (t) for the current decay of the on/off transitions between erase portions 90 and the non-erase portions of servo signal 88 should be less than 20% of the effective length of an erase portion 90, and ideally should match the gap length of a gap-style erase transducer 84. Preferably, rise time (t) should be less than one-half the gap length of a gap-type erase transducer 84 divided by the speed at which magnetic tape 44 traverses past recording head assembly 80. The requirements for rise time (t) are necessary in order to insure that the magnetic signal transitions generated when reading a servo track that includes erase portions 90 will be relatively well defined without a residual low frequency pulse. In addition, the erase current is turned on for about one to two gap lengths less than the 50% duty cycle to obtain a 50% duty cycle in the erased and unerased regions.

An alternate embodiment of an erase transducer 120 for head assembly 80 is shown in FIG. 7. In this embodiment, there are two inner erase elements 122 and two outer erase elements 124. Outer erase elements 124 provide a mechanism to generate combined fringe field 126 on an outer side 128 of inner erase elements 122. Without outer erase elements 124, outer side width 130 would not be the same size as inner side width 132. Although outer erase elements 124 may erase portions of servo signal 88 recorded on servo section 86 by write transducer 92, their outside edge does not generate erase portions 90 which are used to define servo tracks 94. It will be appreciated that, in this embodiment, the overall width of servo section 86 may either be extended so that so that outer erase elements 124 may actually erase a portion of servo signal 88, or outer erase elements 124 may be positioned beyond the edges of servo section 86 such there is no portion of servo signal 88 which is erased by outer erase elements 124 because servo signal 88 is not recorded on magnetic tape 44 in the area passing beneath the outside edge of outer erase elements 124.

Figure 8:
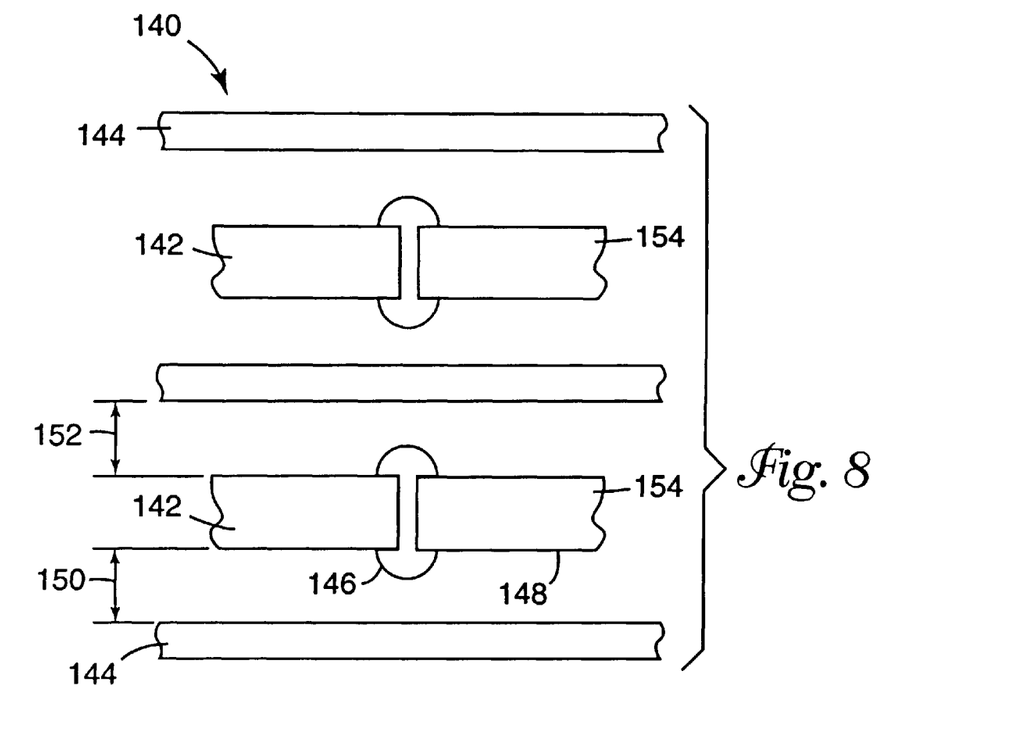
FIG. 8 is a detailed view similar to FIG. 6 of an alternate embodiment of the multi-track servo recording head having erase transducer fringe shields.

Another alternate embodiment of an erase transducer 140 for head assembly 80 is shown in FIG. 8. In this embodiment, there are two erase elements 142 and two transducer fringe shields 144. As with outer erase transducers 122 in FIG. 7, transducer fringe shields 144 in FIG. 8 alters fringe field 146 on an outer side 148 of erase element 142. Without transducer fringe shields 144, outer side width 150 would not be the same size as inner side width 152.

Transducer fringe shields 144 are thin conductive sheets of material positioned a distance preferably slightly less than one-half of an inter track gap distance 154 and operate to create a reflected erase head positioned on outer side 148 at distance approximately equal to inter-track gap distance 154. The reflected erase head essentially duplicates the effect of outer erase transducers 124 to generate the combined fringe field 146 that achieves the desired result of producing an outer side width 150 that is equal to inner side width 152. It would be possible, for example to have a similar thin conductive sheet of material located between erase elements 142 for ease of manufacturing without significantly affecting the magnetic fields between erase elements 142.

It will be noted that the dimensions involved in the very high density recording which are the object of the present invention allows transducer fringe shields 144 to effectively alter the fringe field effects. If erase fringe shields were located significantly further away from outer erase elements 142, then the mirror-effect would not be effective in preventing the problems of fringe field effects identified by the present invention with respect to very high density recordings.

Figure 9:
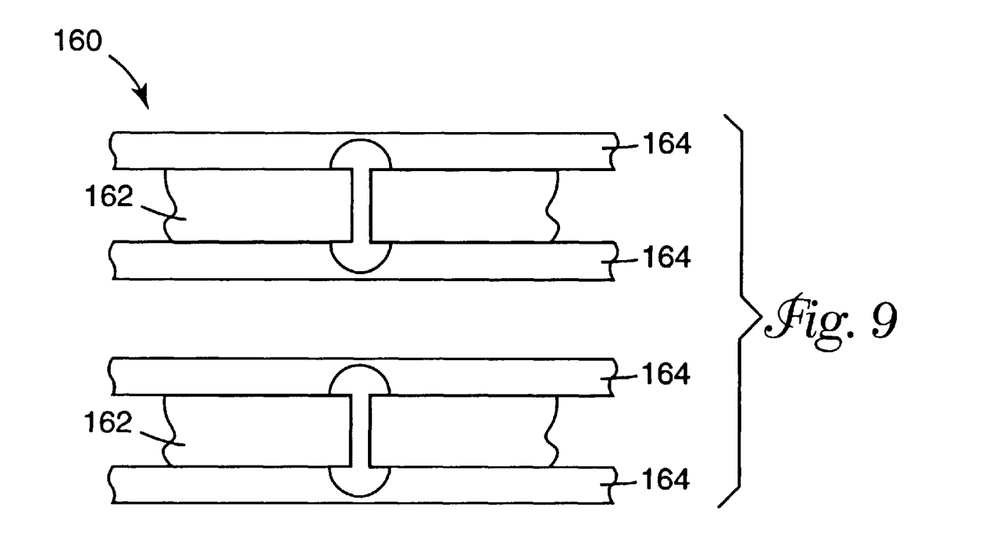
FIG. 9 is a detailed view similar to FIG. 6 of another alternate embodiment of the multi-track servo recording head having erase transducer fringe fields.

Still another embodiment is shown in FIG. 9 in which the function of transducer fringe shields 144 is accomplished by a pair of erase transducer fringe shields 164 positioned essentially adjacent to each erase element 162 as part of an erase transducer 160 for head assembly 80. Erase transducer fringe shields 164 preferably are conductive sheets positioned within 1 μm of each side of an erase element 162. These conductive sheets reduce the width of the fringe field effect between and inner erase element and an outer erase element. The conductive sheets that comprise erase transducer fringe shields 164 may be thin conductive sheets created by evaporation or sputtering techniques during the manufacture of head assembly 80. Alternatively, erase transducer fringe shields 164 may be comprised of thick conductors placed between erase elements 162 and located such that a conductor is essentially adjacent to each side of an erase elements 162.

Figure 10:
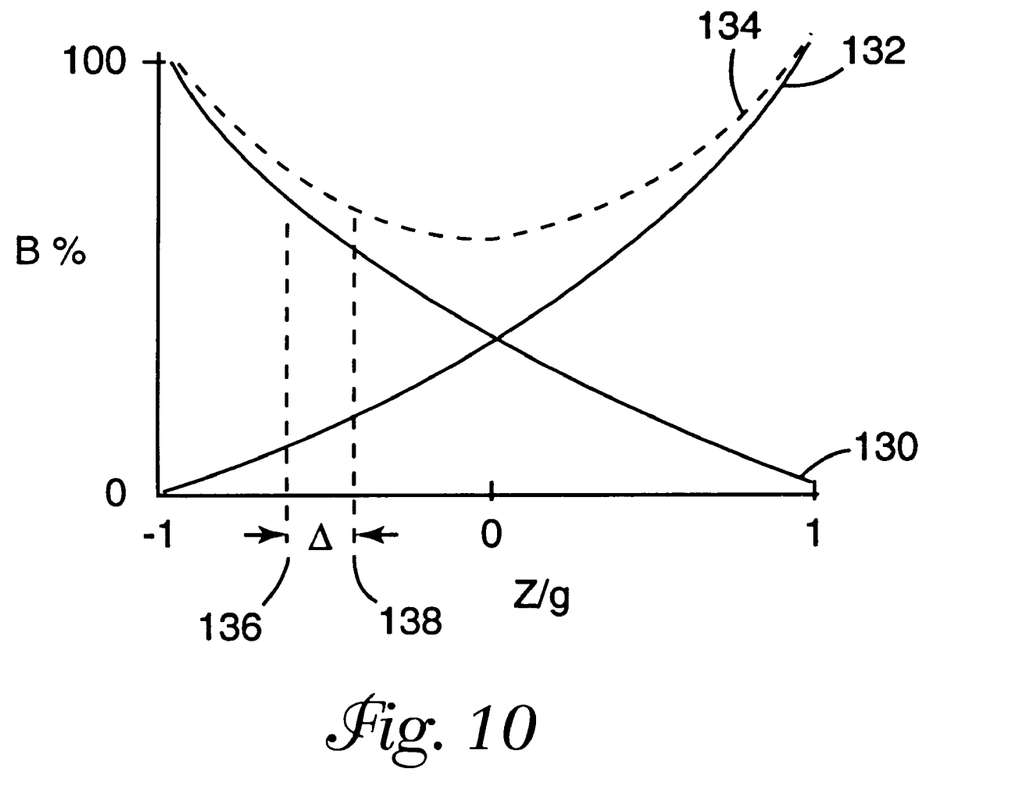
FIG. 10 is a graphic representation of the interaction of adjacent fringe fields when recording servo tracks at very high density track pitches.

Referring now to FIG. 10, an explanation of the phenomenon of the combined fringe field for which the present invention is designed to compensate will be presented. FIG. 10 shows the relationship between percentage of magnetic field strength (B) and the distance in the transverse direction between a pair of adjacent erase elements expressed as (Z/g), where Z is the transverse dimension and g is the gap length of a pair of gap-style erase elements. Line 130 represent the field strength of a first erase element positioned at −1 and line 132 represents the field strength of a second erase element positioned at +1. The midpoint between the first and second erase elements is indicated at 0. Without the presence of the second erase element, the transition of where the fringe field of the first erase element would effectively erase is indicated at position 136. With the presence of the second erase element, the magnetic field represented by line 132 is combined with the magnetic field represented by line 130 producing a combined magnetic field as represented by dotted line 134. In theory the magnetic fields combine in this fashion at any distance between the gaps. However, since the magnetic field does not erase effectively unless the combined field strength is above a certain level, this effect has never been significant. The inventors recognized that the combined magnetic field between adjacent erase elements writing the same or similar signals at gap spacings of less than 60 μm, and particularly less than about 40 μm, are significant. At this size range, the net effect of the combined field is that there is a change in the transition of where the fringe field effectively erases to position 138. The present invention recognizes this effect and compensates for it.

Various changes and modifications to the embodiments of the invention as described will be readily apparent to one of ordinary skill in the art. The present invention therefore is intended to be limited only by the following claims.

I claim:

1. A multi-track servo recording head assembly for recording a plurality of tracks of servo information longitudinally defined within a servo section along a magnetic recording medium, the plurality of tracks of servo information being usable for controlling a position of a magnetic head assembly relative to a plurality of tracks of data information longitudinally defined within a data section along the recording medium, the servo recording head assembly comprising:

a write transducer for writing a servo signal that extends substantially uniformly over a width of the servo section of the magnetic recording medium; and an erase transducer for erasing portions of the servo signal, the erase transducer including:

two outer erase elements, each outer erase element for erasing alternating portions of the servo signal in the servo section to create at least one of the plurality of tracks of servo information; and at least one inner erase element positioned between the two outer erase elements, each inner erase element for erasing alternating portions of the servo signal in the servo section to create at least one of the plurality of tracks of servo information, the outer erase elements and the inner erase element being positioned transversely across the width of the servo section with the inner erase element having an erase head width that is less than an erase head width of the outer erase elements such that a track width of each of the plurality of tracks of servo information is substantially identical.

2. The servo recording head assembly of claim 1 wherein a track width of each of the plurality of tracks of servo information is less than 60 $\mu$m.

3. The servo recording head assembly of claim 2 wherein the track width of each of the plurality of tracks of servo information is less than 40 $\mu$m and the erase head width of the erase elements is less than 30 $\mu$m.

4. The servo recording head assembly of claim 1 wherein each erase element erases the alternating portions of the servo signal in the servo track for an adjacent pair of tracks of servo information such that the alternating portions of the servo signal that are erased extend transversely across only a portion of each of the adjacent pair of servo tracks to define a servo track signal on each of the adjacent pair of servo tracks.

5. A method for recording a plurality of tracks of servo information longitudinally defined within a servo section along a magnetic recording medium, the plurality of tracks of servo information being usable for controlling a position of a magnetic head assembly relative to a plurality of tracks of data information longitudinally defined within a data section along the recording medium, the method comprising the steps of:

a) positioning a write transducer to write a servo signal that extends substantially uniformly over a width of the servo section of the magnetic recording medium;

b) positioning an erase transducer having two outer erase elements and at least one inner erase element transversely across the width of the servo section, the two outer erase elements having an erase head width that is larger than an erase head width of the at least one inner erase element;

c) using the write transducer to write the servo signal on the magnetic recording medium; and d) using the erase transducer to simultaneously erase portions of the servo signal in the servo section using the erase elements to create at least two outer servo tracks corresponding to the outer erase elements and at least one inner servo track corresponding to the inner erase element, all of which have a substantially identical track width.

6. The method of claim 5 wherein step (d) is performed such that each erase element erases the alternating portions of the servo signal in the servo track for an adjacent pair of tracks of servo information such that the alternating portions of the servo signal that are erased extend transversely across only a portion of each of the adjacent pair of servo tracks to define a servo track signal on each of the adjacent pair of servo tracks.

7. The method of claim 5 wherein step (d) includes the step of adjusting a current passing through the erase transducer until all of the servo tracks have a substantially identical track width.

8. The method of claim 5 wherein the erase transducer is a gap-style erase transducer and step (d) includes the steps of:

(d1) passing an AC erase current through the erase transducer to start erasing of one of the erase portions of the servo signal; and (d2) stopping the erase current to stop erasing the one of the erase portions of the servo signal, steps (d1) and (d2) being performed such that a rise time (t) that defines a decay of the AC erase current at each transition is less than twenty percent of an effective longitudinal length of the one of the erase portions of the servo signal and greater than one-half of a gap length of the erase elements of the erase transducer.

9. The method of claim 8 wherein the rise time (t) is equal to the gap length of the erase elements of the erase transducer.

10. The method of claim 5 wherein the duty cycle of the erase current is less than 50% to obtain a 50% duty cycle on tape.

11. The method of claim 10 wherein the duty cycle of the erase current is one to two gap lengths less than a 50% duty cycle.

12. A method for recording a plurality of tracks of servo information longitudinally defined within a servo section along a magnetic recording medium, the plurality of tracks of servo information being usable for controlling a position of a magnetic head assembly relative to a plurality of tracks of data information longitudinally defined within a data section along the recording medium, the method comprising the steps of:

a) positioning a write transducer to write a servo signal that extends substantially uniformly over a width of the servo section of the magnetic recording medium;

b) positioning an erase transducer having two outer erase elements and at least one inner erase element transversely across the width of the servo section;

c) using the write transducer to write the servo signal on the magnetic recording medium; and d) adjusting the currents in the outer erase elements relative to the inner erase elements and using the erase transducer to simultaneously erase portions of the servo signal in the servo section using the erase elements to create at least two outer servo tracks corresponding to the outer erase element and at least one inner servo track corresponding to the inner erase elements, all of which have a substantially identical track width.

13. The method of claim 12 wherein step (d) is performed such that each erase element erases the alternating portions of the servo signal in the servo track for an adjacent pair of tracks of servo information such that the alternating portions of the servo signal that are erased extend transversely across only a portion of each of the adjacent pair of servo tracks to define a servo track signal on each of the adjacent pair of servo tracks.

14. The method of claim 12 wherein the erase transducer is a gap-style erase transducer and step (d) includes the steps of:

(d1) passing an erase current through the erase transducer to start erasing of one of the erase portions of the servo signal; and (d2) stopping the erase current to stop erasing the one of the erase portions of the servo signal, steps (d1) and (d2) being performed such that a rise time (t) that defines a decay of the erase current at each transition is less than twenty percent of an effective longitudinal length of the one of the erase portions of the servo signal and greater than one-half of a gap length of the erase elements of the erase transducer.

15. The method of claim 14 wherein the rise time (t) is equal to the gap length of the erase elements of the erase transducer.

16. The method of claim 12 wherein the erase elements each have a width and are spaced apart by a track pitch, and the width of each erase element is at least 2.5 $\mu$m less than the track pitch.

17. The method of claim 16 wherein the width of each erase element is at least 5 $\mu$m less than the track pitch.

* * * * *